(12) United States Patent
Faulkner et al.

(10) Patent No.: US 12,510,720 B2
(45) Date of Patent: Dec. 30, 2025

(54) CONNECTION INTERFACE FOR FIBER OPTIC CABLE ASSEMBLIES AND METHOD OF MAKING SUCH CABLE ASSEMBLIES

(71) Applicant: CORNING RESEARCH & DEVELOPMENT CORPORATION, Corning, NY (US)

(72) Inventors: Michael Todd Faulkner, Granite Falls, NC (US); Lars Kristian Nielsen, Denver, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 258 days.

(21) Appl. No.: 18/337,672

(22) Filed: Jun. 20, 2023

(65) Prior Publication Data
US 2024/0012217 A1   Jan. 11, 2024

Related U.S. Application Data (60) Provisional application No. 63/358,344, filed on Jul. 5, 2022.

(51) Int. Cl.
*G02B 6/44*   (2006.01)
*G02B 6/40*   (2006.01)

(52) U.S. Cl.
CPC .......... *G02B 6/4471* (2013.01); *G02B 6/403* (2013.01)

(58) Field of Classification Search
None
See application file for complete search history.

(56) References Cited

U.S. PATENT DOCUMENTS

| | | | |
|---|---|---|---|
| 6,352,372 B1 | 3/2002 | Shahid | |
| 6,364,539 B1 | 4/2002 | Shahid | |
| 7,228,047 B1* | 6/2007 | Szilagyi | G02B 6/3878 385/86 |
| 7,711,236 B2* | 5/2010 | Gonzalez | G02B 6/4477 385/136 |
| 8,582,945 B2 | 11/2013 | Duis et al. | |
| 10,725,261 B2* | 7/2020 | Kobayashi | G02B 6/4431 |

(Continued)

FOREIGN PATENT DOCUMENTS

| | | |
|---|---|---|
| WO | 2002/082143 A1 | 10/2002 |
| WO | 2012/174221 A2 | 12/2012 |
| WO | 2014/174333 A1 | 10/2014 |

*Primary Examiner* — Jerry Rahll
(74) *Attorney, Agent, or Firm* — Adam R. Weeks (57) ABSTRACT

A connection interface for a fiber optic cable carrying a plurality of optical fibers. The connecting interface includes a body having a first face, a second face and a sidewall joining the first face and the second face. The sidewall includes an outer portion that defines a periphery of the body and an inner portion. The body also includes at least one holding bore. The at least one holding bore is configured to receive a first group of optical fibers from the plurality of optical fibers. Additionally, the inner portion is configured to passively receive a second pass-through group of optical fibers from the plurality of optical fibers that extends past the connection interface. A cable assembly including a fiber optic cable and one or more connection interfaces is disclosed, and a method of forming a fiber optic cable assembly with one or more connecting interfaces is also disclosed.

18 Claims, 5 Drawing Sheets

(56) References Cited

U.S. PATENT DOCUMENTS

| | | | |
|---|---|---|---|
| 11,269,145 B2* | 3/2022 | Poe | G02B 6/4404 |
| 2002/0146216 A1 | 10/2002 | Schofield et al. | |
| 2014/0010499 A1 | 1/2014 | Suematsu et al. | |
| 2018/0299625 A1 | 10/2018 | Fabian et al. | |
| 2022/0035109 A1* | 2/2022 | Poe | G02B 6/2558 |
| 2022/0120988 A1 | 4/2022 | Houser et al. | |

* cited by examiner

CONNECTION INTERFACE FOR FIBER OPTIC CABLE ASSEMBLIES AND METHOD OF MAKING SUCH CABLE ASSEMBLIES

PRIORITY APPLICATION

This application claims the benefit of priority of U.S. Provisional Application No. 63/358,344, filed on Jul. 5, 2022, the content of which is relied upon and incorporated herein by reference in its entirety.

TECHNICAL FIELD

This disclosure relates generally to optical fiber connectivity, and more particularly to a connection interface for fiber optic cable assemblies that efficiently utilize space and permit an increase in fiber density in fiber optic cable assemblies and fiber optic installations. The disclosure also relates to fiber optic cable assemblies having such connection interfaces and methods of making such fiber optic cable assemblies.

BACKGROUND

Optical fibers are useful in a wide variety of applications, including the telecommunications industry for voice, video, and data transmissions. Advantages of optical fibers include wide bandwidth and low noise operation. In a telecommunications system that uses optical fibers, there are typically many locations where fiber optic cables containing the optical fibers connect to equipment or other fiber optic cables. To provide these connections, fiber optic connectors are often provided at an end of the fiber optic cable to enable connection and disconnection of the fiber optic cable to a fiber optic adapter. The adapter allows fiber optic cables to be attached to other fiber optic cables singly or to a large network. To that end, fiber optic cables can be pre-terminated or field-terminated using simplex, duplex, or multifiber connectors and be connected to other, similarly terminated fiber optic cables.

Demand for bandwidth is increasing. To meet future network bandwidth demand, fiber optic installations require efficient space utilization, especially in campus and in data-center backbone installations where physical space is already limited. Making efficient use of space includes installing higher cabled fiber counts. This amounts to increasing the number of optical fibers per unit cross-sectional area in the space available. For example, with a need for increased fiber count, ribbon cable is often the simplest, easiest, and fastest way to plan for future network needs. Ribbon cable, such as RocketRibbon® cable from Corning Optical Communications LLC, provides a high fiber density relative to cable size currently available. So, ribbon cable maximizes the fiber cable count in pathways, such as ducts, raceways, and patch panels, by providing a high density of optical fibers in those predefined spaces. Yet, with high fiber count ribbon cable, fiber density may be limited by connectors utilized to terminate the optical fibers in the ribbon cable.

One unavoidable consequence of using connectors is that they are much larger in cross sectional dimension than the corresponding ribbon(s) that they terminate. So, the connectors consume valuable space with a large relative cross-sectional area compared to the cross-sectional area of fiber optic cables themselves. As a result, the overall fiber count for a fiber optic cable, and fiber density, can be limited by the use of connectors when space for the fiber optic cable is also limited.

For example, a fiber optic cable assembly may include connectors along a length of a fiber optic cable. The connectors are needed to connect to multiple other cable assemblies. The other cable assemblies may be simplex cable assemblies, two-fiber cable assemblies, and/or multifiber cable assemblies. The connectors may be staggered along the length of the fiber optic cable. Staggering offsets the relatively bulky connectors along the length of the fiber optic cable and thus limits an overall outside dimension of the fiber optic cable assembly to less than a dimension of an aggregation of all connectors being placed side-by-side. Staggering is therefore a space-saving technique for the installation.

Limiting the overall cross-sectional dimension of the fiber optic cable assembly by staggering the connectors may ensure that the cable assembly fits within a predetermined pathway or meets a manufacturer's specification on installation. Among other factors, the fiber optic cable assembly manufacturer may specify a maximum size of a cable assembly to enable the assembly to be installed, such as being pulled through a conduit or duct. As one example, cable manufacturers often specify installation conditions, including a pulling grip size, for their fiber optic cable assemblies. Staggering connectors may keep the outside diameter of the fiber optic cable assembly within the inside diameter of the specified pulling grip size. Further, for defined spaces, (e.g., a conduit), limiting the overall cross-sectional dimension of the fiber optic cable assembly maximizes clearance between the cable assembly and the physical boundaries of the defined space.

While fiber optic cable assemblies, including associated connectors, are generally commercially successful, there is a need in the fiber optic industry for improved fiber optic connections and devices for increasing fiber density in fiber optic installations.

SUMMARY

One aspect of the disclosure is directed to a connection interface for a fiber optic cable carrying a plurality of optical fibers. The connection interface includes a body having a first face, a second face and a sidewall joining the first face and the second face. The sidewall includes an outer portion that defines a periphery of the body and an inner portion. The body also includes at least one holding bore that is configured to securely receive a first group of optical fibers from the plurality of optical fibers. Additionally, the inner portion of the sidewall is configured to passively receive a second pass-through group of optical fibers from the plurality of optical fibers of the fiber optic cable that extends past the connection interface.

In one embodiment, the inner portion of the sidewall may include a channel and a through-bore in the body, the channel opening to the through-bore, and the channel and/or the through-bore may be configured to passively receive the second pass-through group of optical fibers. For example, the second pass-through group of optical fibers may be passively received only in the through-bore. In another embodiment, the at least one holding bore comprises a plurality of holding bores, and the plurality of holding bores at least partially surrounds the through-bore. In one embodiment, the outer portion of the sidewall defines a generally circular periphery, and the through-bore is generally circular in shape.

In another embodiment, the outer portion of the sidewall may define a rectangular periphery. Moreover, in one embodiment, the through-bore may also be generally rectangular in shape.

In one embodiment, the body of the connection interface may include a pair of opposing short sides and a pair of opposing long sides, and the channel may be in one of the short sides.

In an alternative embodiment, however, the inner portion of the sidewall includes a channel that is configured to passively receive the second pass-through group of optical fibers, the body of the connection interface may include a pair of opposing short sides and a pair of opposing long sides, and the channel may be in one of the long sides. In this embodiment, the body of the connection interface may include another channel in the other of the opposing long sides of the body, and the another channel may be configured to passively receive a third pass-through group of optical fibers from the plurality of optical fibers of the fiber optic cable that extends past the connection interface. In a further embodiment, the body of the connection interface may include another channel and another through-bore, and the third group of optical fibers may be passively received in the another channel and/or the another through-bore. Additionally, the at least one holding bore may be positioned between the channel and the another channel or between the through-bore and the another through-bore. The optical fibers in the second pass-through group and/or the third pass-through group of optical fibers may include one or more fiber optic ribbons, one or more fiber optic subunits, or other configurations of optical fibers.

In one embodiment, the at least one holding bore comprises a plurality of holding bores each configured to receive a respective optical fiber from the first group of optical fibers.

A second aspect of the disclosure is directed to a fiber optic cable assembly. The fiber optic cable assembly includes a fiber optic cable carrying a plurality of optical fibers and at least one connection interface coupled to the fiber optic cable. The at least one connection interface includes a body having a first face, a second face and a sidewall joining the first face and the second face. The sidewall includes an outer portion that defines a periphery of the body and an inner portion. The body further includes at least one holding bore. A first group of optical fibers from the plurality of optical fibers of the fiber optic cable is positioned in the at least one holding bore. A second pass-through group of optical fibers from the plurality of optical fibers of the fiber optic cable is passively received along the inner portion of the sidewall and extends past the connection interface.

In one embodiment, the inner portion of the sidewall may include a channel and a through-bore in the body, the channel opening to the through-bore, and the channel and/or through-bore may passively receive the second pass-through group of optical fibers. The optical fibers in the second pass-through group and/or the third pass-through group of optical fibers may be configured as one or more fiber optic ribbons, one or more fiber optic subunits, or other configurations of optical fibers.

In one embodiment, the at least one holding bore in the body may include a plurality of holding bores, and the plurality of holding bores at least partially surrounds the through-bore. In still a further embodiment, the first group of optical fibers may be terminated by at least one ferrule and the at least one holding bore may securely receive the at least one ferrule. In still a further embodiment, the body of the at least one connection interface defines a ferrule that terminates the first group of optical fiber, the at least one holding bore in the body may include a plurality of holding bores, and each optical fiber in the first group of optical fibers is secured in a respective holding bore of the plurality of holding bores.

In one embodiment, for the at least one connection interface, the inner portion of the sidewall of the body includes a channel that passively receives the second pass-through group of optical fibers, the body defines a ferrule that terminates the first group of optical fibers whereby the at least one holding bore comprises a plurality of holding bores and each optical fiber in the first group of optical fibers is secured in a respective holding bore of the plurality of holding bores. In another embodiment, for the at least one connection interface, the body includes another channel that passively receives a third pass-through group of optical fibers from the plurality of optical fibers that extend past the connection interface.

In one embodiment, the at least one connection interface may include a plurality of connection interfaces at different locations along a length of the fiber optic cable. The optical fibers in the second pass-through group and/or the third pass-through group of optical fibers may include one or more fiber optic ribbons, one or more fiber optic subunits, or other configurations of optical fibers.

A third aspect of the disclosure is directed to a method of making a fiber optic cable assembly. The method includes providing a fiber optic cable carrying a plurality of optical fibers and securely positioning a first group of optical fibers from the plurality of optical fibers of the fiber optic cable at a connection interface. The connection interface includes a body having a first face, a second face, and a sidewall joining the first face and the second face. The sidewall includes an outer portion that defines a periphery of the body and an inner portion. Securely positioning the first group of optical fibers includes inserting the first group of optical fibers in at least one holding bore in the body of the connection interface. The method further includes passively positioning a second group of optical fibers from the plurality of optical fibers of the fiber optic cable along the inner portion of the body so as to extend past the connection interface.

In one embodiment, the inner portion of the sidewall may include a channel and a through-bore in the body, the channel opening to the through-bore, and passively positioning the second group of optical fibers may further include passively positioning the second group of optical fibers in the channel and/or the through-bore. In another embodiment, the inner portion of the sidewall includes a channel in the body so that passively positioning the second group of optical fibers further includes passively positioning the second group of optical fibers in the channel. The body of the connection interface may include another channel, and the method may further include passively positioning a third group of optical fibers from the plurality of optical fibers of the fiber optic cable in the channel so as to extend past the connection interface.

BRIEF DESCRIPTION OF THE DRAWINGS

The accompanying drawings are included to provide a further understanding and are incorporated in and constitute a part of this specification. The drawings illustrate one or more embodiment(s), and together with the description explain principles and operation of the various embodiments. Features and attributes associated with any of the embodiments shown or described may be applied to other embodiments shown, described, or appreciated based on this disclosure.

DETAILED DESCRIPTION

With reference generally to the figures, a connection interface 10 according to embodiments of the disclosure is for use in a fiber optic cable assembly 12. By way of example, the fiber optic cable assembly 12 may be in a data center interconnect application where high fiber density is desired. However, embodiments of the disclosure are not limited those applications. Other fiber optic installations are contemplated, and embodiments of the disclosure are suitable for use where it is desirable to limit a cross-sectional area of the fiber optic cable assembly 12 to maximize fiber density.

The connection interface 10 can take different forms, several of which are shown in the figures and described below. In general, the connection interface 10 securely receives some optical fibers 16 that are carried by a fiber optic cable 14 and allows other optical fibers 16 of the fiber optic cable 14 to pass through without being secured to the connection interface 10. The optical fibers 16 securely received at the connection interface 10 are terminated, meaning that they have an end with a component (e.g., a ferrule) installed for helping establish an optical connection. The connection interface 10 may define a ganged arrangement for such components, with each coupled to a body of the connection interface 10 to securely receive the optical fibers 16 that are terminated by the components. Alternatively, in accordance with some embodiments that will be described below, the connection interface 10 itself may be the component directly terminating the optical fibers 16, thereby functioning as a ferrule or optical connector. Thus, references in this disclosure to the optical fibers 16 being "terminated at" the connection interface 10 includes both situations where the optical fibers 16 are terminated by a component coupled to a body of the connection interface 10 and where the optical fibers 16 are terminated directly by the body of a connection interface 10. The term "connection interface" refers to an optical connector, optical connector sub-assembly, or one or more optical connector components, such as ferrules, that facilitate coupling of the optical fibers on which they are installed to other optical fibers that are terminated with a same or different connector interface.

Figure 1:
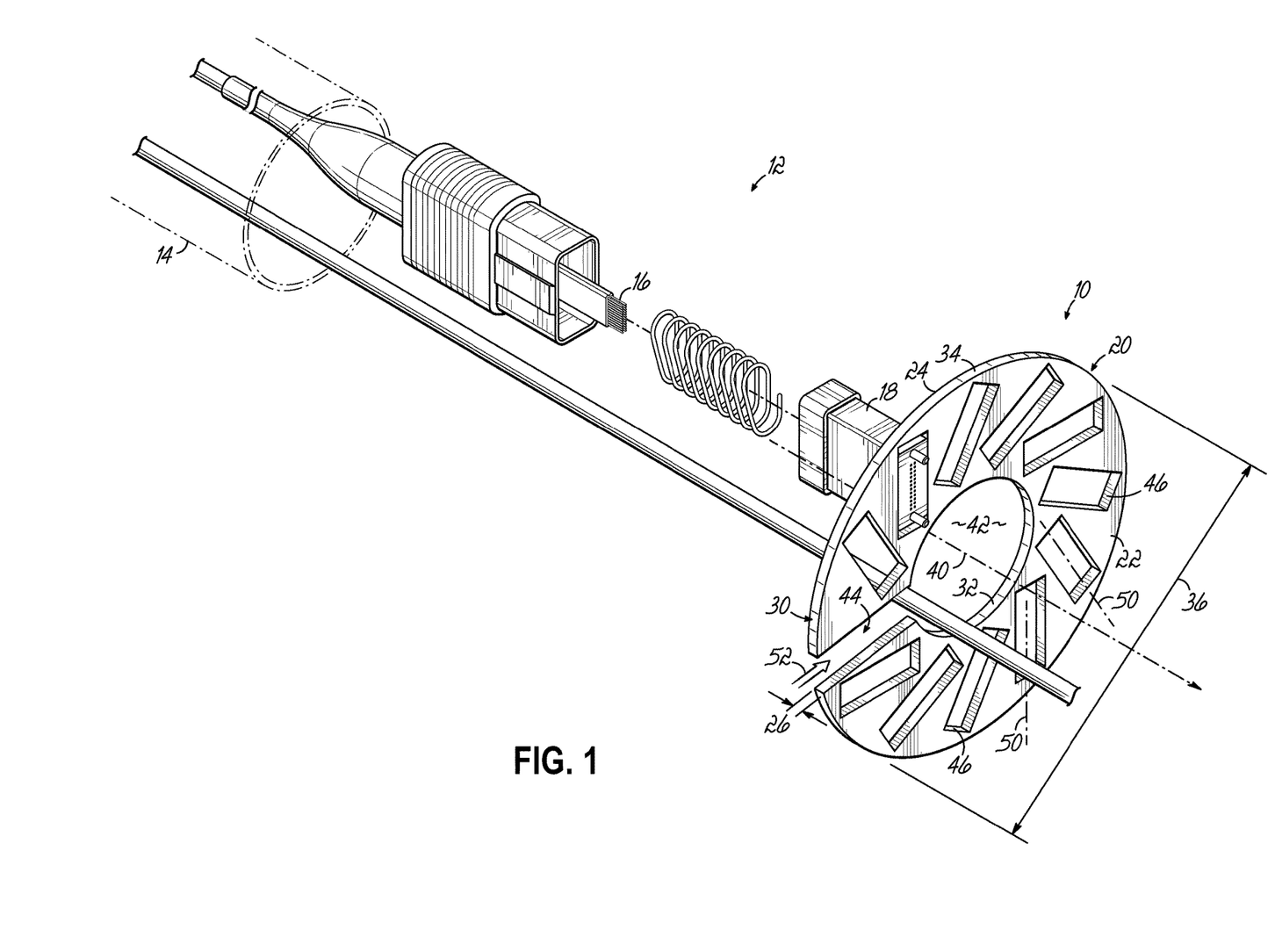
FIG. 1 is a perspective view of a fiber optic cable assembly having a connection interface according to one embodiment of the disclosure.

A first example embodiment is generally shown in FIG. 1, with the fiber optic assembly 12 including a fiber optic cable 14 carrying a plurality of optical fibers 16. The fiber optic cable 14 may be a high fiber count cable with many optical fibers 16 arranged in ribbons, subunits, or other subsets of optical fibers 16. As used in this disclosure, the terms "ribbon", "optical fiber ribbon", or "fiber optic ribbon" are used interchangeably to refer to a group of optical fibers 16 (e.g., 4, 8, 12, or 24 optical fibers) that are configured to be arranged side-by-side in an array, with adjacent optical fibers 16 being held together at least intermittently by a binding material (e.g., adhesive), tape, or the like. Many different cable designs are known for fiber optic ribbons. As a specific example, the fiber optic cable 14 may be a RocketRibbon® or other high fiber count cable. In this regard, U.S. Publication No. 2022/0120988, which is incorporated by reference in its entirety, discloses an exemplary fiber optic cable 14 that may be used in various embodiments of the disclosure. Selected ones or groups of the optical fibers 16 in the fiber optic cable 14 terminate at the connection interface 10 while the remaining ones or groups of optical fibers 16 pass through the connection interface 10.

In FIG. 1, the connection interface 10 is shown at a location in which one or more optical fibers 16 of fiber optic cable 14 are terminated mid-length or intermediate between two end locations (not shown) of the fiber optic cable assembly 12. Other optical fibers 16 pass through the connection interface 10 to be terminated at another connection interface 10 at another spaced apart location along the fiber optic cable 14. In that case, one or more connection interfaces 10 may be positioned between ends of the fiber optic cable 14. At this intermediate location of fiber optic cable 14, a group of optical fibers 16 terminate at the connection interface 10 and so are made available for connection. For example, the optical fibers 16 may be connected to devices or are made available for connection to other fiber optic assemblies (not shown) at the connection interface 10. The connection interface 10 may therefore provide one portion of a joint/coupling between optical fibers 16. The connection interface 10 may be utilized at these joints to limit the cross-sectional area consumed by the fiber optic cable assembly 12. As noted above, while only a single connection interface 10 is shown, it should be understood that multiple connection interfaces 10 may be installed at selected locations along the fiber optic cable 14.

In that regard, where the fiber optic cable 14 and the connection interface exist at one lengthwise location in the fiber optic cable assembly 12, the connection interface 10 defines a maximum cross-sectional dimension of the fiber optic cable assembly 12. The maximum cross-sectional dimension may be less than and/or more consistent than a cross-sectional dimension of an assembly using connectors/adapters known in the art in which the connectors/adapters are staggered. In addition, the connection interface 10 may enable a more uniform cross-sectional area over the entire length of the fiber optic cable assembly 12. As an example, the cross-sectional area of the fiber optic cable assembly 12 from end-to-end may vary from a minimum of a cross-section of cable-only regions (e.g., the cross section of cable 14) to a maximum of a cross-sectional area of the connection interface 10. Because the difference is minimized between the cross-sectional area of the cable-only region and the cross-sectional area of the connection interface 10, the fiber optic cable assembly 12 may be more uniform in cross-sectional dimension along its length. The fiber optic cable assembly 12 may also be more uniform in cross-sectional shape, because the connection interface 10 is configured to encompass or encircle pass-through optical fibers (described below and shown in FIG. 3). This is in contrast with a fiber optic cable assembly having one or more connectors/adapters at a mid-length location, which may have a nonsymmetrical cross-section that may vary along the length of the fiber optic cable assembly. Advantageously, for a set fiber count, fiber optic cable assemblies 12 may be packaged within smaller tubing and so may be inserted into a smaller duct size as compared to assemblies of the prior art in which connectors/adapters are utilized, for example.

With reference to FIG. 1, a first group of optical fibers 16, which may be provided by one or more ribbons or other arrangement of optical fibers, may be terminated with at least one ferrule 18 (one shown). The ferrule 18 may be an MT ferrule (as shown) configured to receive 2, 4, 8, 12, 16, 24, 32, or 48 or more optical fibers 16 of the fiber optic cable 14. In the assembly shown, the connection interface (which may be referred to as a fitting or sleeve), includes a plate-like body 20 having opposing faces 22, 24 that define an axial thickness 26. As shown, the body is a single, unitary part. In a plate-like configuration, the axial thickness 26 of the body 20 is uniform, though embodiments are not limited to a uniform thickness. A sidewall 30 extends between opposing faces 22, 24. The sidewall 30 includes an inner portion 32 and an outer portion 34. The outer portion 34 defines a periphery of the body 20. The periphery may have a circular configuration, as shown; however, other peripheral configurations are possible and are described below. The outer portion 34 of the sidewall 30 determines a maximum outer dimension 36 of the body 20 and so generally defines a cross-sectional area of the connection interface 10. As shown, the maximum outer dimension 36 is measured generally perpendicular to a central axis 40 of the body 20. In the embodiment shown, the maximum outer dimension 36 is an outer diameter of the body 20. The cross-sectional area of the body 20 is calculated from the outer diameter. The dimension 36 may be selected to be less than a manufacturer's specification for a maximum outer dimension for a particular application or installation technique. When the connection interface 10 is installed, the central axis 40 is generally aligned with the lengthwise direction of the fiber optic cable 14. Thus, the connection interface 10 is assembled with one or both planes defined by the opposing faces 22, 24 generally perpendicular to the lengthwise direction of the fiber optic cable 14.

With continued reference to FIG. 1, the inner portion 32 of the sidewall 30 defines features of the body 20 inside the periphery established by the outer portion 34 of the sidewall 30. As such, no portion of the inner portion 32 of the sidewall 30 defines a maximum outer dimension of the body 20. In the exemplary embodiment shown, the inner portion 32 defines a through-bore 42 and a channel 44. The through-bore 42 is accessible from locations outside the periphery via the channel 44. The channel 44 and/or through-bore 42 receive a second group of optical fibers 16, which may be provided by one or more ribbons, one or more subunits, or other arrangements of optical fibers carried by the fiber optic cable 14, and permit those optical fibers 16 to pass through and extend beyond the connection interface 10. The connection interface 10 does not restrict relative movement with respect to the pass-through optical fibers 16. That is, the optical fibers in the channel 44 and/or through-bore 42 are slidable relative to the connection interface 10. As shown, each of the through-bore 42 and channel 44 extend from one face 22 to the opposing face 24 and so traverse the axial thickness 26 of the body 20. The opposing portions of inner portion 32 of the sidewall 30 defining channel 44 may be spaced apart at a dimension less than the diameter of the through-bore 42 and may result in a narrowing of the channel 44 relative to the through-bore 42. Overall, in the configuration shown, the sidewall 30 defines a C-shaped body. In that regard, the inner portion 32 is spaced apart from the outer portion 34 so that a center of the through-bore 42 is generally concentric with the central axis 40, though embodiments of the invention are not limited to that configuration.

The body 20 of the connection interface 10 between the spaced apart inner portion 32 and the outer portion 34 of the sidewall 30 includes one or more holding bores 46 that, in the embodiment shown, are cutouts each configured to securely receive a ferrule 18. The holding bores 46 open to each of the opposing faces 22 and 24 and are sized and shaped to correspond to the size and shape of the ferrules 18 received therein. In the embodiment shown, the holding bores 46 are generally rectangular to receive an MT ferrule. Other shapes, however, are possible so as to correspond to the shape of the ferrule. The connection interface 10 therefore functions as a "ganging" component that secures one or more ferrules 18 in a predictable orientation in the fiber optic cable assembly 12. The ferrule 18 may be secured to the body 20 in any suitable manner, including without limitation by way of an interference fit, latching features, adhesive, fasteners, etc. When the ferrule 18 is inserted in the holding bore 46, this group of optical fibers 16 carried in the fiber optic cable 14 are available for connection with another optical device (not shown).

As shown, the holding bores 46 in the body 20 have a longitudinal axis 50 in the plane of the body 20. The longitudinal axis 50 of each holding bore 46 does not intersect the central axis 40. Instead, each holding bore 46 is oriented so that it is generally tangent to the inner portion 32 of sidewall 30. In this way, a width dimension from the inner portion 32 of the sidewall 30 to an outer portion 34 of the sidewall 30 is, at most, slightly greater than the largest dimension (i.e., diagonal dimension) of the holding bores 46. Other orientations of the holding bores 46 are possible. The orientation of the holding bores 46 may be adjusted to permit more or fewer ferrules 18 to be secured in the body 20 or to reduce the outer dimension 36 of the body 20. Although not shown, the body 20 may include one or more alignment features for alignment of a corresponding connection interface to the body 20.

While the holding bores 46 are configured to receive ferrules 18 that terminate a first group of optical fibers, a second pass-through group of optical fibers may be inserted through the channel 44 (in the direction of arrow 52) and into the through-bore 42. Pass-through optical fibers, which do not terminate at the location of the connection interface 10, may be routed through the connection interface 10 and to their termination point up/down stream of the connection interface 10. In this way, select optical fibers of the fiber optic cable 14 may be terminated at the connection interface 10 in an organized arrangement with any and/or all remaining optical fibers of the fiber optic cable 14 being routed through the connection interface 10. The pass-through optical fibers are passively received in the channel 44 and/or through-bore 42 and so are able to slide relative to the connection interface 10 during installation. The pass-through optical fibers are within the periphery established by outer portion 34 of the sidewall 30 and so do not add to the overall cross-sectional dimension of the assembly 12. Instead, the connection interface 10 defines an upper limit for the overall dimension of the assembly 12 because the pass-through optical fibers plus the ferrules 18 of the terminated optical fibers no longer determine the dimensions at the junction established by connection interface 10. At the connection interface 10, the diameter 36 of the connection interface 10 determines the overall dimension of the fiber optic cable assembly 12. That is, the cross-sectional dimensions of the fiber optic cable assembly 12 at a location at which fiber optic cable 14 is terminated are determined solely by the connection interface 10 and not by a combination of one or more of the ferrules 18 and pass-through optical fibers (not shown). By way of example, there are eleven holding bores 46 in the connection interface 10 of FIG. 1. The outer dimension of the fiber optic cable assembly 12 having from 1 to 11 ferrules 18 is unchanged. Stated in another way, the outer dimension of a fiber optic cable assembly 12 with one ferrule 18 would be the same as the outer dimension of an assembly 12 with eleven ferrules 18 because all ferrules 18 are received at the connection interface 10 and all pass-through optical fibers extend through the bore 42 and/or channel 44 of the connection interface 10.

Figure 2:
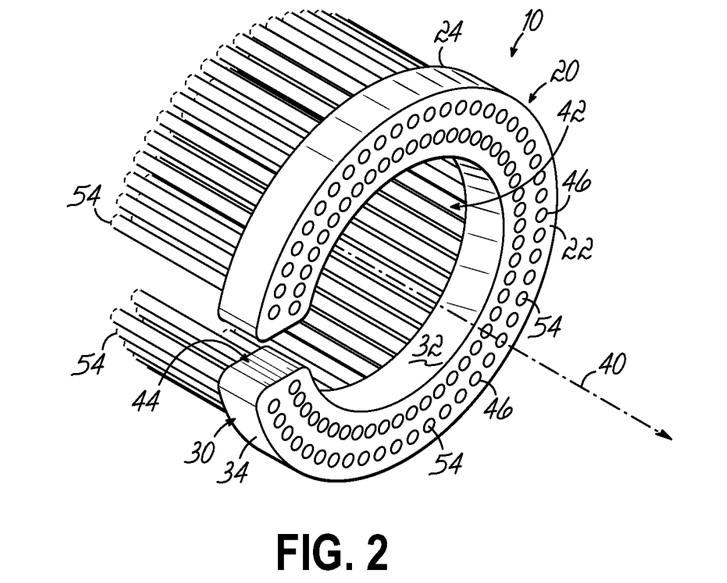
FIG. 2 is a perspective view of a connection interface according to another embodiment of the disclosure.
Figure 3:
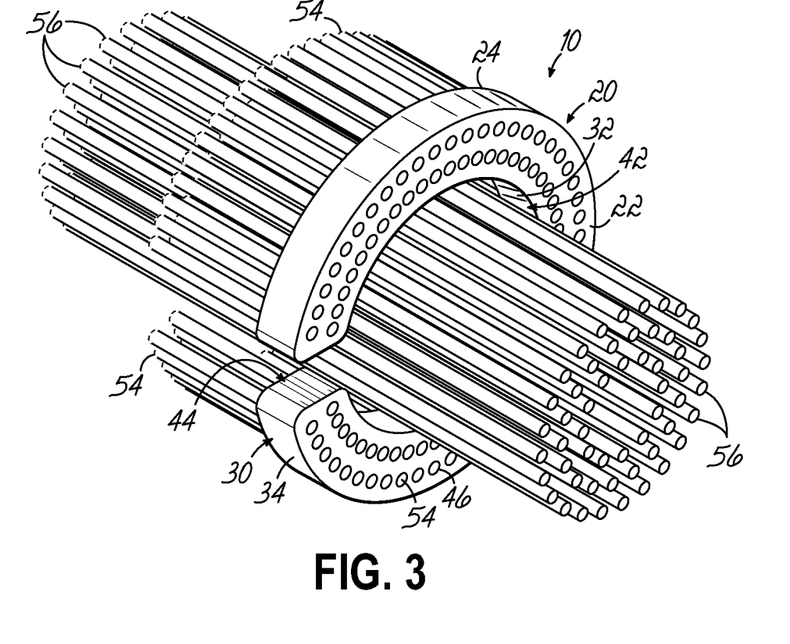
FIG. 3 is a perspective view of the connection interface of FIG. 2 illustrating optical fibers extending through the connection interface according to one embodiment of the disclosure.

With reference to FIGS. 2 and 3, in which like reference numerals refer to like features of FIG. 1, the body 20 of the connection interface 10 is configured to securely receive optical fibers directly, i.e., without a separate ferrule. Thus, unlike the body 20 in FIG. 1 that includes the holding bores 46 receiving separate ferrules 18, in the embodiment shown in FIGS. 2 and 3, the body 20 of the connection interface 10 itself functions as a ferrule or ferrule-like component with holding bores 46 receiving individual optical fibers 54. The optical fibers 54 can be secured to the body 20 with adhesive (e.g., similar to a micro-bore of a conventional ferrule).

As shown in FIGS. 2 and 3, the body 20 is generally C-shaped as described above with respect to FIG. 1. In the exemplary embodiment, two rows of holding bores 46 are arranged along two arcs of differing radii of curvature in the body 20. Individual ones of the optical fibers 54 enter the body 20 in a respective one of the holding bores 46 at one face 24 and terminate at the opposing face 22. Although not shown, the body 20 may include one or more alignment features for alignment of a corresponding body to the body 20 to facilitate alignment with the optical fibers 54.

Each of the optical fibers 54 is therefore available for connection at the face 22 of the body 20 of the connection interface 10 for distribution to another location in a different direction than central axis 40 and so may not be in the direction of pass-through optical fibers 56 (FIG. 3) passing through the connection interface 10 in the through-bore 42 and/or channel 44. The optical fibers 56 have opposing ends (not shown) that terminate at a location remote from the connection interface 10. The connection interface 10 may therefore be between the ends and provides for connection of optical fibers 54 while slidably receiving the optical fibers 56 in the through-bore 42 and/or channel 44. In one embodiment, the fiber optic cable assembly 12 includes a plurality of the connection interfaces 10 spaced apart along the length of the fiber optic cable 14. While each holding bore 46 in the body 20 of the connection interface 10 is shown to receive either a ferrule 18 (FIG. 1) or an individual optical fiber 54 (FIGS. 2 and 3), embodiments of the connection interface 10 may receive one or more ferrules and one or more optical fibers in combination.

Figure 4:
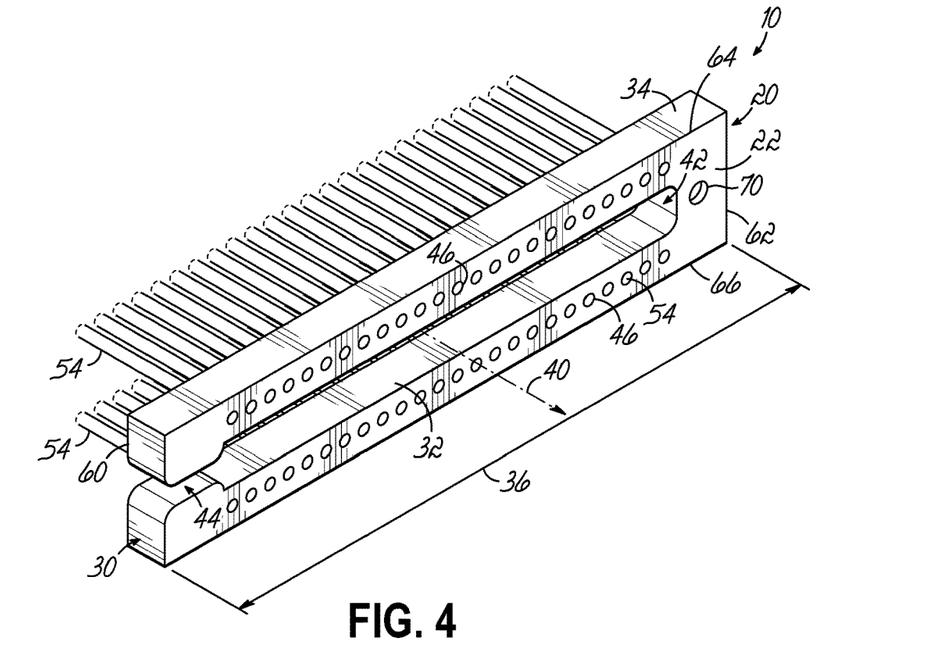
FIG. 4 is a perspective view of a connection interface according to another embodiment of the disclosure.
Figure 5:
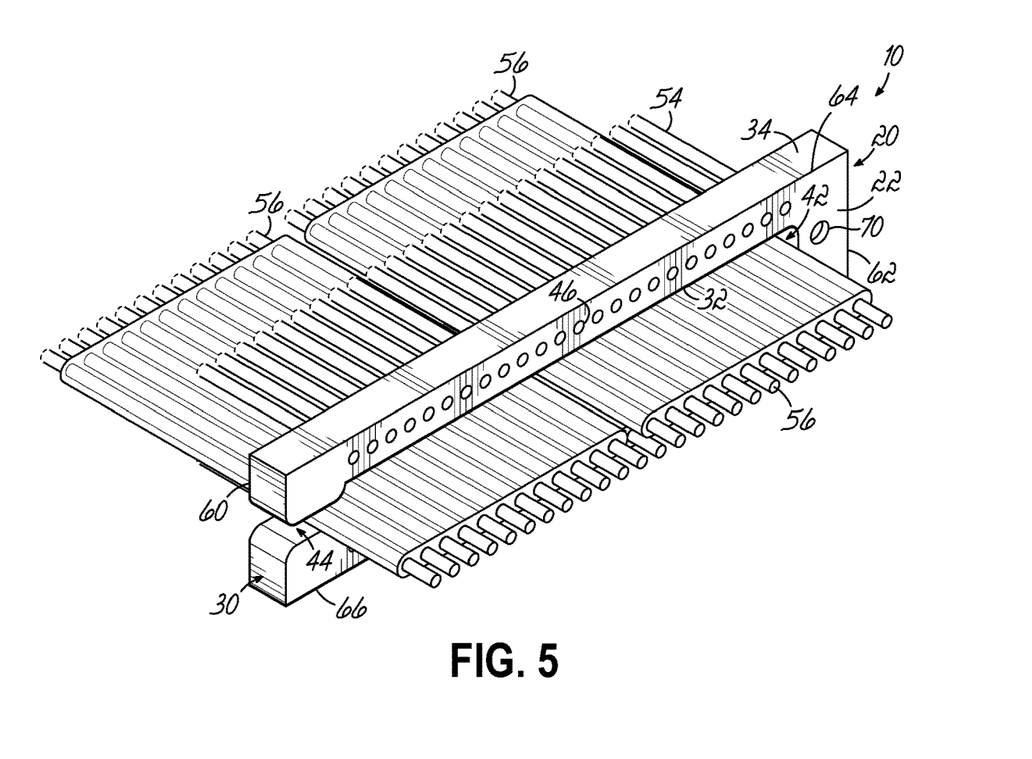
FIG. 5 is a perspective view of the connection interface of FIG. 4 illustrating optical fibers extending through the connection interface according to one embodiment of the disclosure.

With reference to FIGS. 4 and 5, in which like reference numerals refer to like features of FIGS. 1-3, in one embodiment, the connection interface 10 is shown with a different peripheral shape. The outer portion 34 of sidewall 30 defines a generally rectangular periphery so that the maximum outer dimension 36 extends along a long axis of the body 20. The channel 44 opens at a short side 60, 62 of the outer portion 34. The bore 42 is generally rectangularly shaped so that the body 20 has a rectangular C-shape. Single rows of individual fibers 54 are received in holding bores 46 along the two long sides 64 and 66 of the body 20 of the connection interface 10. The optical fibers 54 may be secured within the holding bores 46 using adhesive (e.g., similar to a micro-bore of a conventional ferrule). As shown, the body includes an alignment feature, such as aperture 70, in the short side 62 opposite the channel 44 to receive a corresponding alignment feature, such as a pin (not shown), on another component to which the connection interface 10 may be mated (e.g., another connection interface). Alternatively, the aperture/pin arrangement may be reversed. That is, the body 20 may include an alignment pin at this location that engages an alignment aperture in another connection interface (not shown). As shown in FIG. 5, additional optical fibers 56, such as those carried by ribbons, subunits, or other arrangements of optical fibers are positioned in the through-bore 42 and/or channel 44 for termination at a location up/down stream from the connection interface 10. In the exemplary embodiment, no holding bores 46 are formed on the short sides 60, 62. Although not shown, the channel 44 may open on one of long sides 64, 66 and/or one of the short sides 60, 62 may include one or more holding bores 46.

Figure 6:
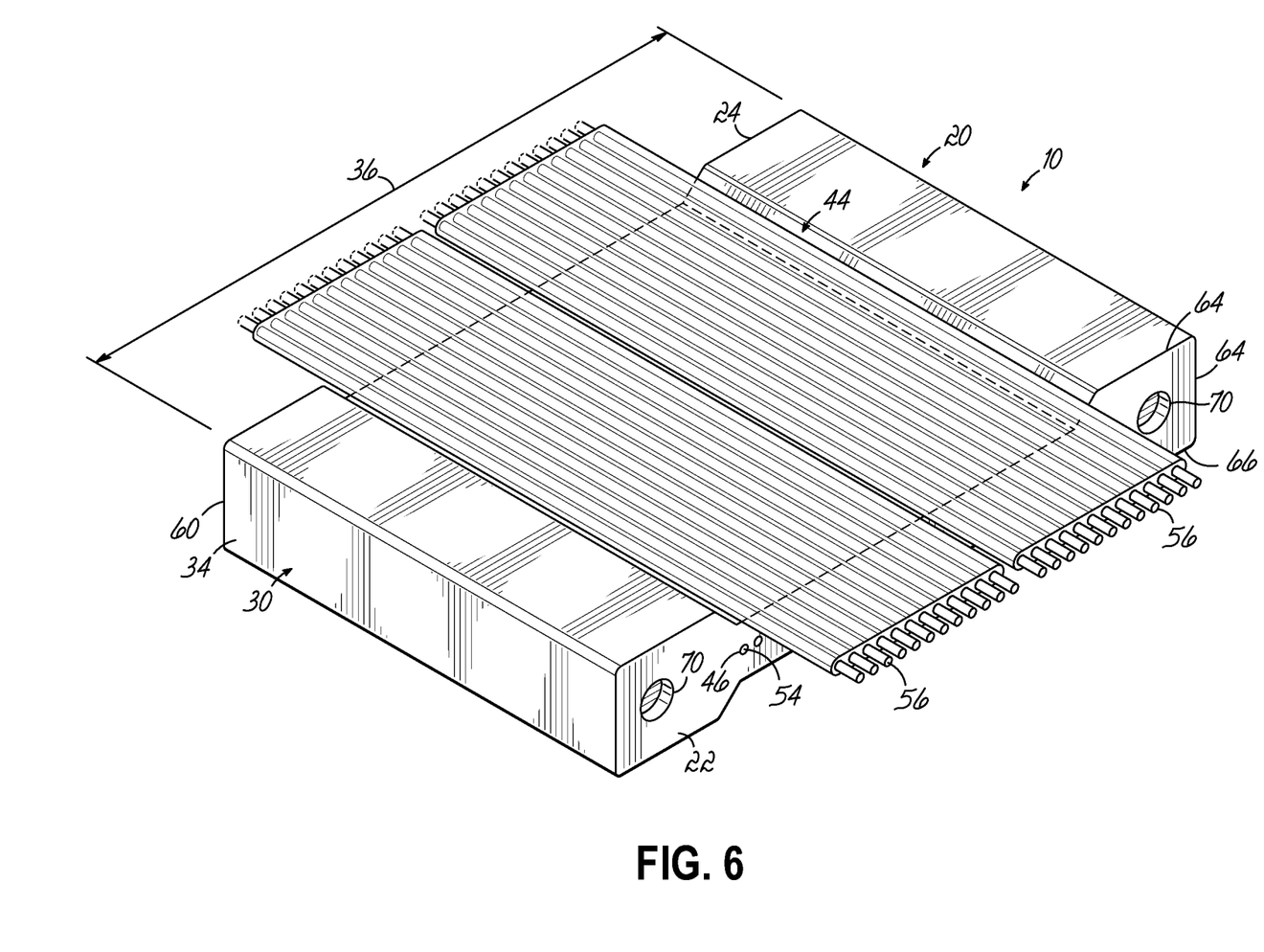
FIG. 6 is a perspective view of a connection interface illustrating optical fibers extending through the connection interface according to another embodiment of the disclosure.

With reference to FIG. 6, in which like reference numerals refer to like features of FIGS. 1-5, the connection interface 10 is shown with a different shape. The outer portion 34 of sidewall 30 defines a rectangular periphery so that the maximum outer dimension 36 extends along a long axis of the body 20. The inner portion 32 of the sidewall defines the channel 44 in the long side 64. In this exemplary embodiment, the body 20 does not include a through-bore that passively receives optical fibers but does still include holding bores 46.

In particular, the connection interface 10 receives a first group of optical fibers 54 from the fiber optic cable 14 in a single row of holding bores 46 along a mid-line of the body 20 and adjacent the channel 44. The optical fibers 54 may be secured within the holding bores 46 using adhesive (e.g., similar to a micro-bore of a conventional ferrule) and are available for establishing optical connections at face 22 of the connection interface 10. The channel 44 passively receives pass-through optical fibers 56. The body 20 includes an alignment feature 70 on each short side 60, 62 that receives an alignment pin. The pin/aperture arrangement may be reversed according to embodiments of the invention. As illustrated, the body 20 of the connection interface 10 may include a channel 44 in the other long side of the body. That channel 44 may receive another group of pass-through optical fibers 56 (not shown).

Figure 7:
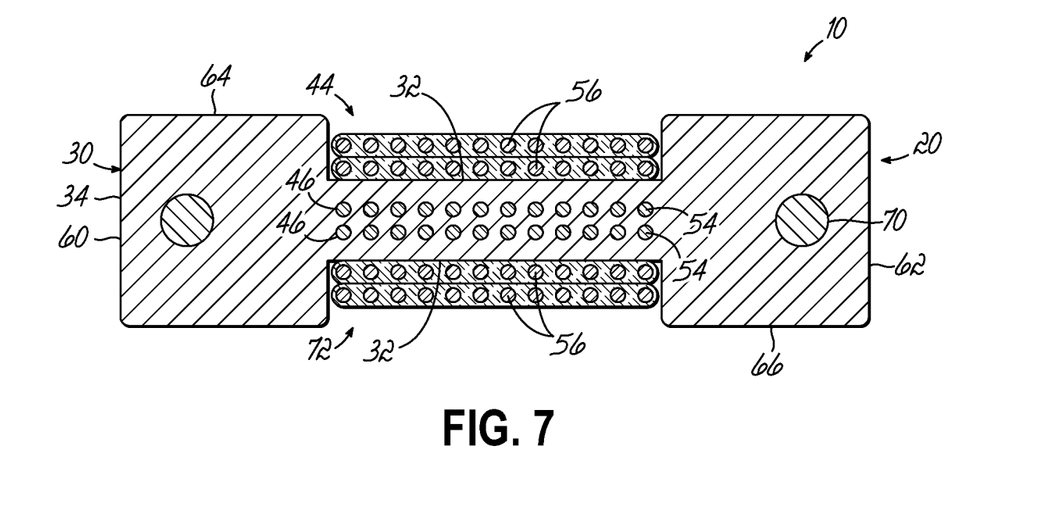
FIGS. 7 and 8 are front elevation views of connection interfaces similar to that shown in FIG. 6 illustrating optical fibers extending through the connection interfaces according to additional embodiments of the disclosure.
Figure 8:
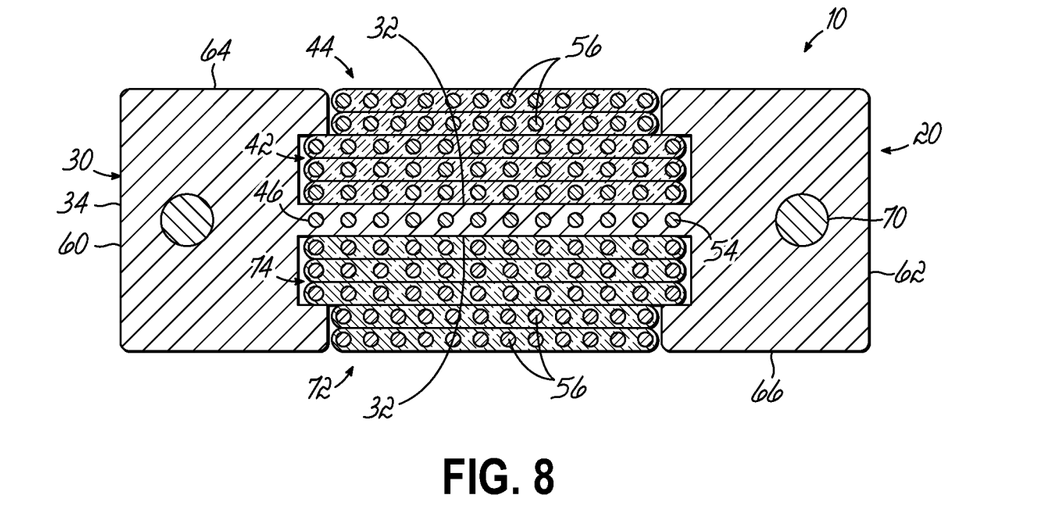

FIGS. 7 and 8 depict schematic elevation views of the face 22 of embodiments of the disclosure which vary from the configuration shown in FIG. 6. In FIG. 7, the inner portion 32 of the sidewall 30 defines channel 44 and an opposing channel 72 in the long sides 64, 66. Individual fibers 54 are received in a double row of holding bores 46 in the body 20 between the channels 44, 72. The channels 44, 72 increase the available space for pass-through optical fibers 56 on opposing sides of body 20, as shown, relative to the embodiment shown in FIG. 6. Advantageously, the cross-sectional dimensions of the body 20 may remain the same as the embodiment shown in FIG. 6 while the available pass-through space, produced by opposing channels 44, 72, is increased. By way of example only, the connection interface 10 includes twenty-four holding bores 46 in which the first group of optical fibers 54 are secured, and the channels 44, 72 are each shown with two twelve-fiber, pass-through optical fibers 56 (e.g., in the form of ribbons).

A similar embodiment is shown in FIG. 8 in which opposing channels 44, 72 open to opposing rectangular through-bores 42, 74. In the exemplary embodiment, each of the through-bores 42, 74 and each of the channels 44, 72 is shown with pass-through optical fibers 56 while the number of holding bores 46 for receiving optical fibers 54 in body 20 is twelve. As an example, the through-bores 42, 74 are shown with three 12 fiber count ribbons 76, and the channels 44, 72 may receive two 12 fiber count ribbons 78 of smaller diameter optical fibers 56.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A fiber optic cable assembly, comprising:
   a fiber optic cable carrying a plurality of optical fibers; and
   at least one connection interface coupled to the fiber optic cable, the at least one connection interface including a body, the body comprising:
   a first face;
   a second face;
   a sidewall joining the first face and the second face, the sidewall having an outer portion that defines a periphery of the body and an inner portion; and
   at least one holding bore;
   a first group of optical fibers from the plurality of optical fibers positioned in the at least one holding bore; and
   a second pass-through group of optical fibers from the plurality of optical fibers passively received along the inner portion and extending past the connection interface,
   wherein the inner portion of the sidewall includes a channel and a through-bore in the body, the channel opening to the through-bore, and wherein the channel and/or through-bore passively receives the second pass-through group of optical fibers.

2. The fiber optic cable assembly of claim 1, wherein the first group of optical fibers is terminated by at least one ferrule, and wherein the at least one holding bore securely receives the at least one ferrule.

3. The fiber optic cable assembly of claim 1, wherein the at least one holding bore comprises a plurality of holding bores, and wherein the plurality of holding bores at least partially surrounds the through-bore.

4. The fiber optic cable assembly of claim 3, wherein the outer portion of the sidewall defines a generally circular periphery, and wherein the through-bore is generally circular.

5. The fiber optic cable assembly of claim 3, wherein the outer portion of the sidewall defines a generally rectangular periphery.

6. The fiber optic cable assembly of claim 5, wherein the through-bore is generally rectangular.

7. The fiber optic cable assembly of claim 5, wherein the body includes a pair of opposing short sides and a pair of opposing long sides, and wherein the channel is in one of the short sides.

8. The fiber optic cable assembly of claim 1, wherein:
   the body of the at least one connection interface defines a ferrule that terminates the first group of optical fibers;
   the at least one holding bore comprises a plurality of holding bores; and
   each optical fiber in the first group of optical fibers is secured in a respective holding bore of the plurality of holding bores.

9. The fiber optic cable assembly of claim 1, wherein the at least one connection interface comprises a plurality of connection interfaces at different locations along a length of the fiber optic cable.

10. The fiber optic cable assembly of claim 1, wherein the second pass-through group of optical fibers includes at least one fiber optic ribbon.

11. A connection interface for a fiber optic cable carrying a plurality of optical fibers, comprising:
    a body comprising:
    a first face;
    a second face;
    a sidewall joining the first face and the second face, the sidewall having an outer portion that defines a periphery of the body and an inner portion; and
    at least one holding bore configured to securely receive a first group of optical fibers from the plurality of optical fibers, and
    wherein the inner portion is configured to passively receive a second pass-through group of optical fibers from the plurality of optical fibers that extends past the connection interface, and
    wherein the inner portion of the sidewall includes a channel configured to passively receive the second pass-through group of optical fibers, wherein the body includes a pair of opposing short sides and a pair of opposing long sides, and wherein the channel is in one of the long sides.

12. The connection interface of claim 11, wherein the body includes another channel in the other of the opposing long sides of the body, and wherein the another channel is configured to passively receive a third pass-through group of optical fibers from the plurality of optical fibers that extends past the connection interface.

13. The connection interface of claim 12, wherein the at least one holding bore is positioned between the channel and the another channel.

14. The connection interface of claim 11, wherein the at least one holding bore comprises a plurality of holding bores each holding bore configured to receive a respective optical fiber from the first group of optical fibers.

15. A fiber optic cable assembly, comprising:
    a fiber optic cable carrying a plurality of optical fibers; and
    at least one connection interface coupled to the fiber optic cable, the at least one connection interface including a body, the body comprising:
    a first face;
    a second face;
    a sidewall joining the first face and the second face, the sidewall having an outer portion that defines a periphery of the body and an inner portion; and
    at least one holding bore;

a first group of optical fibers from the plurality of optical fibers positioned in the at least one holding bore; and a second pass-through group of optical fibers from the plurality of optical fibers passively received along the inner portion and extending past the connection interface, wherein the second pass-through group of optical fibers includes at least one fiber optic ribbon.

16. A fiber optic cable assembly, comprising:

a fiber optic cable carrying a plurality of optical fibers; and at least one connection interface coupled to the fiber optic cable, the at least one connection interface including a body, the body comprising:
 a first face;
 a second face;
 a sidewall joining the first face and the second face, the sidewall having an outer portion that defines a periphery of the body and an inner portion; and
 at least one holding bore;

a first group of optical fibers from the plurality of optical fibers positioned in the at least one holding bore; and a second pass-through group of optical fibers from the plurality of optical fibers passively received along the inner portion and extending past the connection interface, wherein for the at least one connection interface:
 the inner portion of the sidewall of the body includes a channel that passively receives the second pass-through group of optical fibers;
 the body defines a ferrule that terminates the first group of optical fibers whereby:
  the at least one holding bore comprises a plurality of holding bores; and
  each optical fiber in the first group of optical fibers is secured in a respective holding bore of the plurality of holding bores.

17. The fiber optic cable assembly of claim 16, wherein for the at least one connection interface:

the body includes another channel that passively receives a third pass-through group of optical fibers from the plurality of optical fibers that extend past the connection interface.

18. The fiber optic cable assembly of claim 16, wherein the at least one connection interface comprises a plurality of connection interfaces at different locations along a length of the fiber optic cable.

* * * * *